(12) United States Patent
Suzuki

(10) Patent No.: US 10,769,868 B2
(45) Date of Patent: Sep. 8, 2020

(54) ELECTRONIC CONTROL UNIT

(71) Applicant: DENSO CORPORATION, Kariya, Aichi-pref. (JP)

(72) Inventor: Daisuke Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 302 days.

(21) Appl. No.: 15/981,003

(22) Filed: May 16, 2018

(65) Prior Publication Data

US 2018/0342118 A1 Nov. 29, 2018

(30) Foreign Application Priority Data

May 25, 2017 (JP) ................................. 2017-103928

(51) Int. Cl.
| | |
|---|---|
| *G07C 5/08* | (2006.01) |
| *B60H 3/02* | (2006.01) |
| *F02D 41/14* | (2006.01) |
| *F02D 41/22* | (2006.01) |
| *B60H 1/00* | (2006.01) |

(52) U.S. Cl.
CPC ....... *G07C 5/0808* (2013.01); *B60H 1/00785* (2013.01); *B60H 1/00978* (2013.01); *B60H 3/02* (2013.01); *B60H 3/022* (2013.01); *B60H 3/024* (2013.01); *F02D 41/1441* (2013.01); *F02D 41/222* (2013.01); *B60H 2003/026* (2013.01); *F02D 2200/0418* (2013.01); *F02D 2400/08* (2013.01)

(58) Field of Classification Search
CPC ...... G07C 5/0808; G07C 5/0816–0833; F02D 41/222; F02D 2200/0418; B60H 3/02–024; B60H 2003/026–028; B60H 1/00978; B60H 1/00785
See application file for complete search history.

(56) References Cited

U.S. PATENT DOCUMENTS

| | | | |
|---|---|---|---|
| 7,654,253 B2 | 2/2010 | Cullen | |
| 2008/0270012 A1* | 10/2008 | Cullen | ................... F02M 26/01 701/114 |
| 2012/0227719 A1* | 9/2012 | Surnilla | ................ F02M 26/14 123/676 |
| 2017/0198666 A1* | 7/2017 | Ito | .......................... G01N 25/56 |
| 2018/0029442 A1* | 2/2018 | Inui | ..................... B60H 1/00849 |

* cited by examiner

*Primary Examiner* — Spencer D Patton
(74) *Attorney, Agent, or Firm* — Nixon & Vanderhye P.C.

(57) ABSTRACT

An electronic control unit (ECU) obtains outside air humidity information from a sensor disposed outside a vehicle compartment and inside air humidity information from a sensor inside the vehicle compartment. The ECU includes a humidity information obtainer obtaining the inside air humidity information, a humidity change calculator calculating the inside air humidity information as a difference between (i) a physical quantity correlated with humidity before a start of a dehumidification or a humidification and (ii) a physical quantity correlated with humidity after a switch-off of the dehumidification or the humidification, a soak time calculator calculating, based on the difference of the physical quantities, a soak time from the switch-off of the dehumidification or the humidification to a sensor-diag startable time at which a diagnosis of the outside air humidity sensor is startable, and a comparator comparing the outside air humidity information and the inside air humidity information after a lapse of the soak time from the switch-off of the dehumidification or the humidification.

7 Claims, 5 Drawing Sheets

ELECTRONIC CONTROL UNIT

CROSS REFERENCE TO RELATED APPLICATION

The present application is based on and claims the benefit of priority of Japanese Patent Application No. 2017-103928, filed on May 25, 2017, the disclosure of which is incorporated herein by reference.

TECHNICAL FIELD

The present disclosure generally relates to an electronic control unit that controls a humidity sensor.

BACKGROUND INFORMATION

An electronic control unit used in a vehicle for controlling an internal-combustion engine typically obtains physical quantities from an environment in which the vehicle travels, for a control of a drive of the internal-combustion engine. Humidity is one of such quantities. Since the internal-combustion engine mixes outside air taken in from the environment and fuel for the combustion, the electronic control unit needs to control the combustion based on the humidity of the outside air for an appropriate drive of the engine. Further, the electronic control unit also needs to refer to inside air humidity, i.e., humidity in a vehicle compartment (or in a passenger compartment), for controlling a degree of dehumidification performed by an evaporator when cooling the vehicle compartment by an air-conditioning device. Note that a vehicle compartment may also be designated as a passenger compartment in the following.

As described above, the electronic control unit obtains humidity information from an outside air humidity sensor and from an inside air humidity sensor disposed outside and inside of the vehicle, for controlling a drive of the internal-combustion engine and/or the evaporator. Therefore, failure of the humidity sensor may deteriorate the comfort in the vehicle, e.g., driver's comfort during the driving of the vehicle. In view of such a situation, various methods are proposed for detecting the failure of the humidity sensor. For example, a failure detection method for detecting the failure of the humidity sensor disclosed in a patent document 1, U.S. Pat. No. 7,654,253, is a method that detects a failure or degradation of the humidity sensor disposed outside of the vehicle, i.e., outside of the vehicle compartment, more practically. In such method, humidity obtained from the humidity sensor disposed outside of the vehicle compartment is compared with humidity obtained from the humidity sensor inside the vehicle compartment after a lapse of preset soak time after switching OFF of an ignition switch, and, based on a difference between two humidity values being greater than a preset value, it is determined that the humidity sensor is suffering from a functional degradation.

However, in the method disclosed in the patent document 1, it is unclear whether the length of the preset soak time is long enough against a variation of the humidity values obtained from the outside/inside air humidity sensors. That is, failure detection accuracy of such method may not be necessarily high. Further, if a sufficiently-long soak time is set, the failure detection accuracy may be improved, with a trade-off of a decrease or loss of the number of failure detection opportunities. That is, when the number of failure detection opportunities decreases, the detection of failure may be delayed.

More practically, when the number of failure detection opportunities decreases, the following drawbacks may be experienced. That is, the humidity value obtained from the inside air humidity sensor is normally expected to be different from the humidity value obtained from the outside air humidity sensor, due to either the dehumidification or humidification operation of the air-conditioning device. The soak time should basically be set to a length of time that is required for, i.e., sufficient for, the humidity value from the inside air humidity sensor to substantially return to the humidity value from the outside air humidity sensor after switching OFF the ignition switch. For the improvement of the failure detection accuracy for detecting the failure of the humidity sensor, the soak time may need to be set to a length of time based on the worst case, i.e., the maximum humidity value difference between the outside air humidity and the inside air humidity. In addition, the vehicle may be used in very diverse environments with varying humidity levels and the required soak time for covering all the various environments may need to be very long. Thus, a very long soak time may be too long for a vehicle used in a normal or average environment, i.e., decreasing the number of failure detection opportunities too much, and may delay the detection of a failure of the humidity sensor in the vehicle

SUMMARY

It is an object of the present disclosure to provide an electronic control unit that performs a failure detection operation for detecting a failure of the humidity sensor at appropriate timings.

In an aspect of the present disclosure, the electronic control unit (ECU) that obtains outside air humidity information from an outside air humidity sensor disposed at a position outside a vehicle compartment of a vehicle and inside air humidity information from an inside air humidity sensor disposed at a position inside the vehicle compartment, among which the outside air humidity information from the outside air humidity sensor indicates outside air humidity and the inside air humidity information from the inside air humidity sensor indicates inside air humidity, includes: a humidity information obtainer obtaining the inside air humidity information; a humidity change calculator calculating the inside air humidity information regarding difference between (i) a physical quantity correlated with humidity before a start of a dehumidification or a humidification and (ii) a physical quantity correlated with humidity after a switch-off of the dehumidification or the humidification; a soak time calculator calculating, based on the difference of the physical quantities, a soak time from the switch-off of the dehumidification or the humidification to a sensor-diag startable time at which a diagnosis of the outside air humidity sensor is startable; and a comparator comparing the outside air humidity information and the inside air humidity information after a lapse of the soak time from the switch-off of the dehumidification or the humidification, wherein the soak time calculator calculates the soak time as a shorter length of time as the difference decreases.

As it is discussed above, the conventional art of having a preset fixed value for the soak time sets the soak time to a relatively long length. On the other hand, the electronic control unit in the present disclosure variably sets the soak time based on a difference between (i) a physical quantity that correlates to the humidity before starting the dehumidification or humidification and (ii) a physical quantity that correlates to the humidity after stopping (i.e., a switch OFF of) the dehumidification or humidification. Therefore, according to such variable soak time setting scheme, the soak time is always set to an appropriate length of time, which means that a too-long soak time leading to the loss of a failure detection opportunity is prevented and/or limited while also preventing and/or limiting a too-short soak time for a very humid or dry environment. That is, too few frequencies and too many frequencies of a failure detection operation are both limited and/or prevented. Thus, the failure detection operation of the humidity sensor is appropriately performable by a variable length soak time with high accuracy.

BRIEF DESCRIPTION OF THE DRAWINGS

Objects, features, and advantages of the present disclosure will become more apparent from the following detailed description made with reference to the accompanying drawings, in which.

DETAILED DESCRIPTION

In the following description, a plurality of embodiments of the present disclosure are described, with reference to the drawings. In the plurality of embodiments, like parts have like numbers, and the description of the like parts may be not repeated. The configuration of one embodiment in part or as a whole may be combined with other embodiment(s), unless otherwise indicated. A possibility of combination of two or more embodiments may be explicitly described, or may only be suggested or may be not mentioned.

First Embodiment

The first embodiment of the present disclosure, including the outline configuration of an electronic control unit for the present embodiment is described with reference to FIGS. 1 and 2.

The electronic control unit in the present embodiment is an electronic device which controls an internal-combustion engine in a vehicle such as, for example, an engine control ECU. This electronic control unit performs control of an internal-combustion engine and an air-conditioner based on the information on humidity, which may be derived from communication with the humidity sensors disposed outside and inside of a passenger compartment. That is, the ECU and the humidity sensors are communicably connected. Further, the ECU performs control for diagnosing the humidity sensor.

Figure 1:
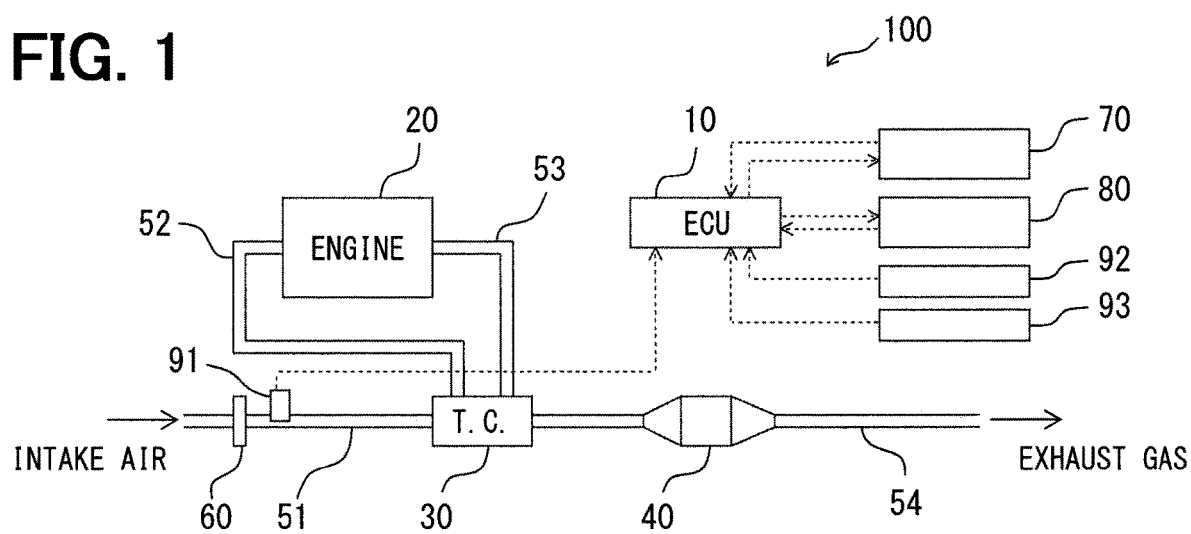
FIG. 1 is a block diagram of an engine control system in a first embodiment of the present disclosure.

As shown in FIG. 1, an electronic control unit 10 constitutes a part of an engine control system 100. That is, the engine control system 100 is provided with the electronic control unit 10, an engine 20, a turbocharger 30, and a post-process apparatus 40. In addition, the engine control system 100 is provided with a first suction passage 51 which introduces the outside air into the turbocharger 30, a second suction passage 52 which sends an intake air from the turbocharger 30 to the engine 20, a first exhaust passage 53 which introduces an exhaust gas of the engine 20 into the turbocharger 30, and a second exhaust passage 54 which discharges the exhaust gas from the turbocharger 30. An air cleaner 60 is installed in the first suction passage 51.

The engine control system 100 is further provided with an air-conditioner system 70, an air circulation system 80, and various sensors 91, 92, and 93. Various sensors are, for example, an outside air humidity sensor 91, an inside air humidity sensor 92, and an in-vehicle temperature sensor 93. The air-conditioner system 70, the air circulation system 80, and the various sensors 91, 92, and 93 are, respectively, communicably connected with the electronic control unit 10.

First, elements and components other than the electronic control unit 10 are described.

The engine 20 is a mechanism for transferring power to the wheels in a vehicle and driving the vehicle. The engine 20 in the present embodiment is the one that sucks the outside air, mixes the air with fuel, and burns the mixture, for example, which may be a gasoline engine and/or a diesel engine. The axial output generated by the engine 20 determines its torque and the number of rotations, and contributes to the charging of the battery. Further, thermal power generated by the engine 20 contributes to heating energy, e.g., to heat the vehicle compartment. The engine 20 is connected to the turbocharger 30 via the second suction passage 52, for taking in the outside air. On the other hand, the exhaust gas of the engine 20 is discharged to the turbocharger 30 via the first exhaust passage 53, is detoxified by the post-process apparatus 40, and is discharged toward the outside of the vehicle.

The turbocharger 30 is a supercharger which compresses the intake air to supply a high-density air to the engine 20. The turbocharger 30 is connected to the engine 20 with the second suction passage 52 and the first exhaust passage 53. The turbocharger 30 has a turbine rotated by the exhaust gas from the engine 20, and a compressor compressing the intake air by the rotation of the turbine. After the outside air taken in from the first suction passage 51 connected to the turbocharger 30 is compressed by the turbocharger 30, it is supplied to the engine 20.

The post-process apparatus 40 is a device which is disposed in the second exhaust passage 54 at a downstream position to the turbocharger 30, and detoxifies the exhaust gas of the engine 20. In the post-process apparatus 40, a particulate filter which captures and removes particulates in the exhaust gas is provided, for example. The particulate filter may have a mechanism in which an oxidation catalyst is used for removing a hydrocarbon component. The post-process apparatus 40 may also include a NOx catalyst. Such catalyst decomposes and removes the nitrogen oxide in the exhaust gas. The NOx catalyst may use a reduction method, such as a urea selection reduction method and an occlusion reduction method, for efficient decomposition.

The air cleaner 60 is disposed in the first suction pass 51, and filters and removes sand, dust, moisture, etc. contained in the outside air. By using the air cleaner 60, intrusion of foreign substances into the turbocharger 30 or into the engine 20 is limited and/or prevented.

The air-conditioner system 70 is a system for conditioning air, and has, especially for cooling, a dehumidifying function including an evaporator. The air-conditioner system 70 performs cooling and dehumidification in the passenger compartment according to a user's operation or according to an instruction from the electronic control unit 10.

The air-conditioner system 70 has a system which takes in air from the passenger compartment, for example, and performs decompression cooling by the evaporator, and the water vapor condensed by such cooling to reach a dew point changes its state from gas to liquid, i.e., to water, and the water is discharged to the outside of the vehicle. In such manner, dehumidification of the passenger compartment is performed. Therefore, when the air-conditioner system 70 is working as a dehumidifier system, humidity of the air after passing the evaporator ("POST DEHUMIDIFIER HUMIDITY") is lower than humidity of the air before passing the evaporator ("PRE DEHUMIDIFIER HUMIDITY"). The amount of condensed water by the evaporator corresponds to the amount of dehumidification. The air-conditioner, system 70 in the present embodiment has a mechanism that can detect (i) humidity information before passing the evaporator and (ii) humidity information after passing based on actual measurement or based on estimation.

The air circulation system 80 is a system that chooses either an outside air introduction mode or an inside air recirculation mode about circulation of air in the passenger compartment. Although one of the two modes is basically selected by the user's operation, the two modes are also switchable according to a situation by the electronic control unit 10 in the present embodiment.

Here, the outside air introduction mode is an operation mode which takes in the outside air (i.e., air from outside of the vehicle) regarding how the air is "circulated" in the passenger compartment, in which direct communication between the outside and the inside of the vehicle is established. That is, in the outside air introduction mode, time to achieve a state of equilibrium between the outside and the inside of the vehicle is reduced. On the other hand, the inside air recirculation mode is an operation mode which does not take in the outside air for the air circulation, i.e., which simply circulates air in the passenger compartment, in which the inside of the passenger compartment and the outside of the passenger compartment are kept separated. In the inside air recirculation mode, since positive air exchange with the outside is not performed, time to achieve a state of equilibrium between the outside and the inside of the passenger compartment is long or increases compared with the outside air introduction mode. Note that, even in the inside air recirculation mode, since the inside of the passenger compartment is not tightly sealed from the outside of the vehicle, the air exchanged therebetween through a gap between a door and a vehicle body is possible, for example.

The outside air humidity sensor 91 is a sensor attached to an air flow meter that is disposed at a downstream position of the air cleaner 60. That is, the outside air humidity sensor 91 detects humidity of air immediately after the air is taken into the first suction passage 51, and outside air humidity information detected by the outside air humidity sensor 91 reflects humidity of the outside air. The outside air humidity sensor 91 is connected with the electronic control unit 10, and the outside air humidity sensor 91 provides the outside air humidity information. Note that, in the present embodiment, the outside air humidity information which is detected and provided by the outside air humidity sensor 91 is relative humidity. The electronic control unit 10 in the present embodiment performs processing for failure detection of the outside air humidity sensor 91.

The inside air humidity sensor 92 is a sensor disposed in the passenger compartment. Inside air humidity information detected by the inside air humidity sensor 92 reflects humidity of the air in the passenger compartment. The inside air humidity sensor 92 is connected with the electronic control unit 10, and the inside air humidity sensor 92 provides the inside air humidity information. Note that, in the present embodiment, the inside air humidity information which is detected and provided by the inside air humidity sensor 92 is relative humidity. The electronic control unit 10 in the present embodiment performs a failure detection of the outside air humidity sensor 91 based on an assumption that the inside air humidity sensor 92 is operating normally and correctly. The diagnosis of the inside air humidity sensor 92 may be performed as an electric conductivity check, or the like, for example.

The in-vehicle temperature sensor 93 is a temperature sensor which is disposed in the passenger compartment and detects temperature in the passenger compartment ("ROOM TEMP."). The in-vehicle temperature sensor 93 is connected with the electronic control unit 10, and the in-vehicle temperature sensor 93 provides the information on temperature in the passenger compartment.

The electronic control unit 10 controls the drive of the engine 20 based on the humidity information of the outside air obtained by the outside air humidity sensor 91, and controls the air-conditioner system 70 based on the inside air humidity information in the passenger compartment obtained by the inside air humidity sensor 92 and temperature in the passenger compartment.

Next, the electronic control unit 10 is described in detail.

Figure 2:
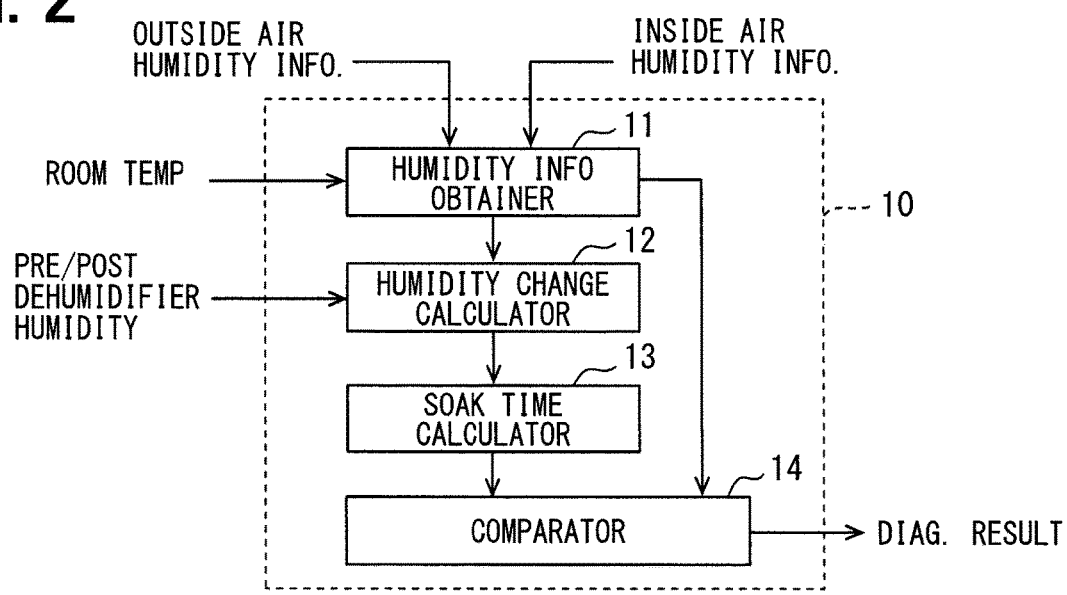
FIG. 2 is a block diagram of an electronic control unit.

As shown in FIG. 2, the electronic control unit 10 is provided with a humidity information obtainer 11, a humidity change calculator 12, a soak time calculator 13, and a comparator 14.

The outside air humidity information is input to the humidity information obtainer 11 from the outside air humidity sensor 91. The inside air humidity information is input thereto from the inside air humidity sensor 92. The information on temperature of the passenger compartment detected by the in-vehicle temperature sensor 93 is also input to the humidity information obtainer 11. Each of the outside air humidity information and the inside air humidity information in the present embodiment is relative humidity, i.e., a ratio of the vapor content (i.e., vapor pressure) of the actual air to the amount of saturated aqueous vapor at a preset temperature (i.e., saturation vapor pressure).

Note that the humidity information obtainer 11 is capable of converting detected relative humidity into a physical quantity, such as absolute humidity (e.g., weight absolute humidity, specific humidity, etc.) and/or air density, based on databases, such as a psychrometric chart stored in the memory which is not illustrated, for example. In case of conversion of the relative humidity to the physical quantity, a physical quantity such as atmospheric pressure and specific enthalpy, which may be obtained by a not-illustrated sensor or may be estimated, is referred to, in addition to the temperature information of the passenger compartment input to the obtainer 11.

The humidity change calculator 12 is a section which calculates change (i.e., difference) of the physical quantity correlated with the humidity during a period between two timings, i.e., a first timing at or before a start of the dehumidification by the dehumidifier system and a second timing, which is at or after the switching OFF of the dehumidifier system. In the present embodiment, the physical quantity is the water content in the passenger compartment, and the change of the physical quantity correlated with humidity is the amount of the dehumidified water, i.e., an amount of dehumidification, for example, although relative humidity, weight absolute humidity, and specific humidity may be variously defined. In the present embodiment, the humidity change calculator 12 calculates the amount of dehumidification from a time of switching ON the ignition switch to a time of switching OFF the ignition switch.

The soak time calculator 13 is a section which calculates and determines a soak time based on the difference calculated by the humidity change calculator 12. The soak time indicates a wait time required before performing a diagnosis of the outside air humidity sensor 91. In the present embodiment, the soak time is set as a time, i.e., a duration, required for equilibrating the environment where the inside air humidity sensor 92 is placed with the environment where the outside air humidity sensor 91 is placed, based on an assumption that the inside air humidity sensor 92 is normal. Therefore, if the two environments are easy to equilibrate, the soak time is set as a relatively short time, and if the two environments are not easy to equilibrate, the soak time is set as a long time.

The comparator 14 is a section which compares the output value of the outside air humidity sensor 91 with the output value of the inside air humidity sensor 92. In the present embodiment, a count of time is started from the ignition switch OFF time, and a diagnosis of the outside air humidity sensor 91 becomes possible after the lapse of the soak time. A sensor-diagnosis or "sensor-diag" startable time is a time at which the diagnosis of the outside air humidity sensor 91 may be started or is possible. When the diagnosis of the outside air humidity sensor 91 becomes possible, the comparator 14 compares the output value of the outside air humidity sensor 91 and the output value of the inside air humidity sensor 92 at such time. Further, based on the comparison result, a diagnosis result is output to the "outside", i.e., to the other device. The diagnosis result means whether there is a possibility of failure of the outside air humidity sensor 91.

Figure 3:
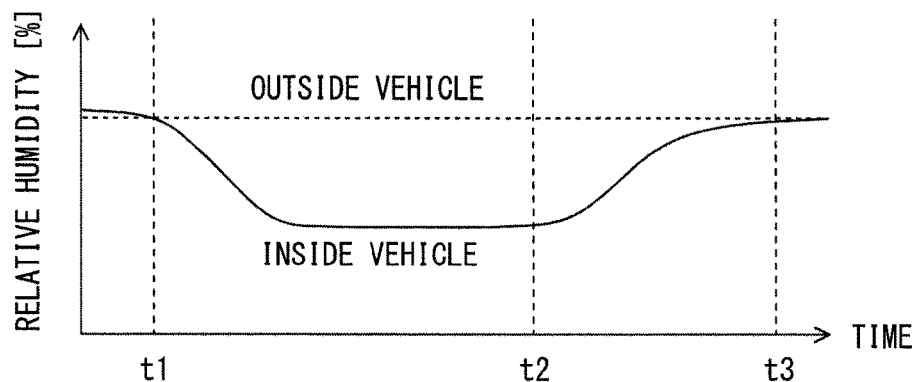
FIG. 3 is a time chart of relative humidity over time.
Figure 4:
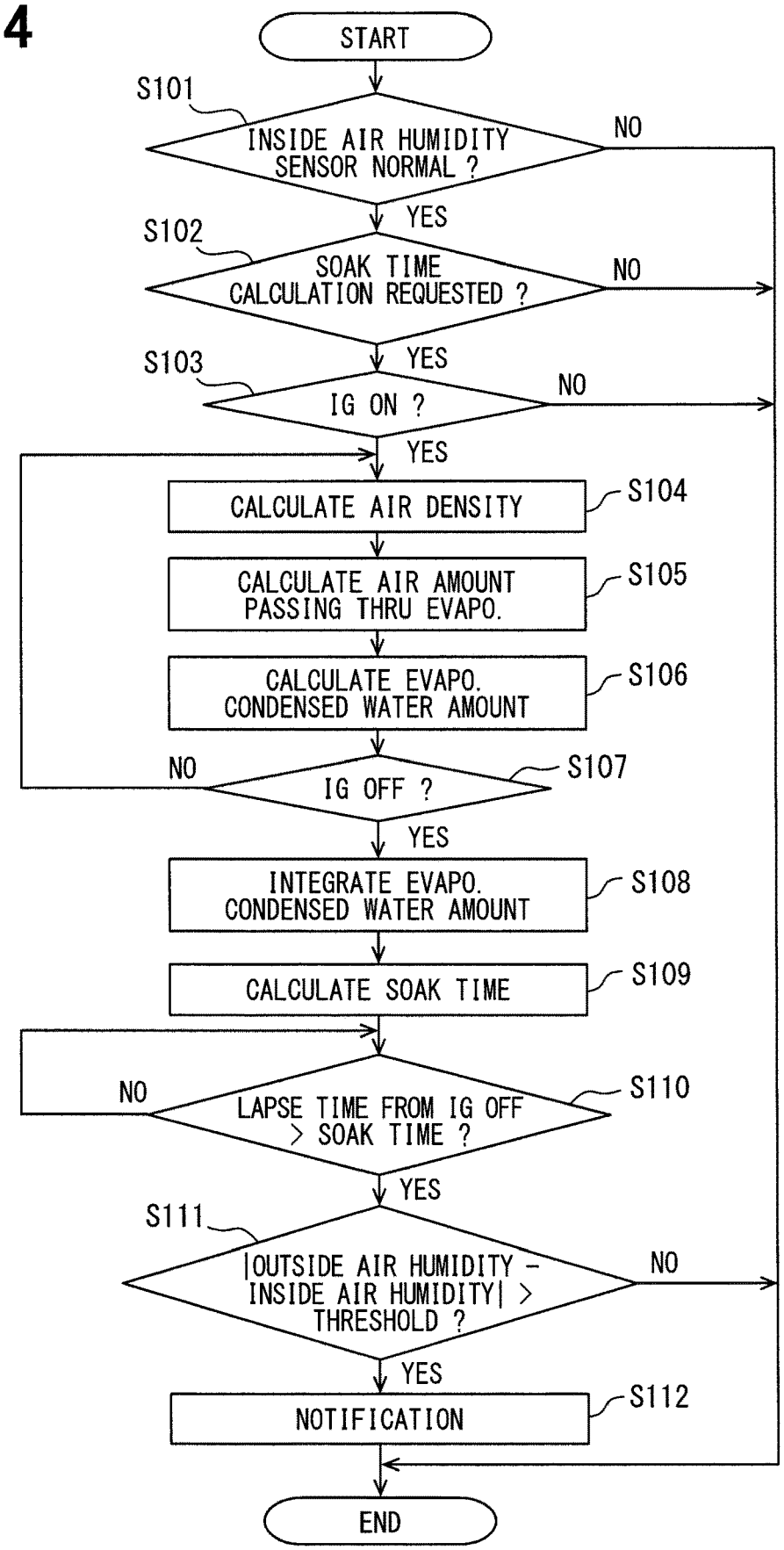
FIG. 4 is a flowchart of an operation of the electronic control unit.

Next, with reference to FIGS. 3 and 4, a practical operation of the electronic control unit 10 in the present embodiment is described.

A situation is assumed as the one shown in FIG. 3. That is, an ignition switch is switched ON at time t1, the air-conditioner system 70 starts almost simultaneously at time t1 for performing the dehumidification. Thereafter, the relative humidity in the passenger compartment falls, and once the relative humidity reaches a target humidity range, such a state is maintained. Then, the ignition switch is switched OFF at time t2, and the dehumidification by the air-conditioner system 70 stops almost simultaneously. The relative humidity in the passenger compartment increases gradually by the exchange of air with the air outside of the vehicle. At or after time t3, the relative humidity inside the passenger compartment and outside the vehicle equilibrates, and the diagnosis of the outside air humidity sensor 91 becomes possible. Here, time from time t2 to time t3 is a length of time required at least as the soak time. Therefore, the electronic control unit 10 sets the soak time at least as the time from t2 to t3, or a time longer than that.

An operation of the electronic control unit 10 for the diagnosis of the outside air humidity sensor 91 is described with reference to an operation flow shown in FIG. 4.

First, Step S101 is performed. In Step S101, diagnosis of the inside air humidity sensor 92 is performed, and it is determined that the inside air humidity sensor 92 is operating normally. This diagnosis may be a confirmation of whether there is a disconnection of wiring or the like in the humidity sensor 92 by supplying electric power to the sensor 92. When it is confirmed that the inside air humidity sensor 92 is operating normally, Step S101 branches to a YES determination. On the other hand, when the inside air humidity sensor 92 is out of order, i.e., may be broken, Step S101 branches to a NO determination, and the diagnosis operation of the outside air humidity sensor 91 is ended.

When Step S101 is a YES determination, Step S102 is performed. Step S102 is a step which determines whether a calculation request of the soak time is given to the electronic control unit 10. The calculation request of the soak time is triggered when, for example, a lapse time from the last diagnosis of the outside air humidity sensor 91 is equal to or greater than a predetermined time, or, when a travel distance of the vehicle is equal to or greater than a preset distance. The calculation request of the soak time is almost equivalent to a diagnosis request of the outside air humidity sensor 91. When the calculation of the soak time is requested, Step S102 branches to a YES determination. When the calculation of the soak time is not requested, Step S102 branches to a NO determination, and the operation flow is ended.

When Step S102 is a YES determination, Step S103 is performed. Step S103 is a step which determines whether the ignition switch is switched ON ("IG ON?"). When the ignition switch is switched ON, Step S103 branches to a YES determination. When the ignition switch is in a switched OFF state, Step S103 branches to a NO determination. In the present embodiment, it is assumed that the dehumidification is started by the air-conditioner system 70 substantially at the same time as the switch ON time of the ignition switch.

When the ignition switch is switched ON and the dehumidification is started, Step S104 is performed. Step S104 is a step which calculates the air density (i.e., an example of a unit: $kg/m^3$) in the passenger compartment. Specifically, the humidity information obtainer 11 calculates the air density in the passenger compartment including vapor, based on the relative humidity (for example, in terms of a percentage %) in the passenger compartment obtained by the inside air humidity sensor 92, inside temperature of the passenger compartment (for example, in terms of a unit such as ° C.) obtained by the in-vehicle temperature sensor 93, and based on a psychrometric chart.

Subsequently, Step S105 is performed. Step S105 is a step which calculates an amount of air (i.e., an example of a unit: $m^3/h$) flowing through the evaporator which constitutes the air-conditioner system 70. Specifically, the humidity change calculator 12 calculates an amount of water condensed by the evaporator based on a passage section area size (i.e., an example of a unit: $m^2$) and a flow speed of the air (m/h) in the evaporator. The passage section area size of the evaporator is a predetermined value which is determinable once the air-conditioner system 70 is identified. The flow speed is a value determined by the number of rotations of the blower which supplies the air to the evaporator.

Subsequently, Step S106 is performed. Step S106 is a step which calculates an amount of water condensed by the evaporator. Specifically, the humidity change calculator 12 calculates the amount of water condensed by the evaporator based on the air density calculated in Step S104, the amount of air flow calculated in Step S105, the specific humidity (unit: kg/kg) before passing the evaporator, the specific humidity after passing the evaporator, and a measurement time (i.e., an example of a unit: h) required for performing Step S104-Step S106. An equation for such calculation may look like (air density)×(amount of air flow)×(specific humidity before passing evaporator−specific humidity after passing evaporator)×(measurement time), for example. The measurement time is determined in advance as a preset constant value. That is, the amount of water calculated in Step S106 is an absolute amount of water condensed by the evaporator in a fixed measurement time. The calculated amount of water is temporarily stored in memory or like hardware, for example.

Subsequently, Step S107 is performed. Step S107 is a step which determines whether the ignition switch is switched OFF ("IG OFF?"). When the ignition switch is switched OFF, Step S107 branches to a YES determination, and, when the ignition switch is in a switched ON state, Step S107 branches to a NO determination. Note that, in the present embodiment, it is assumed that, when the ignition switch is switched OFF, the dehumidification by the air-conditioner system 70 stops substantially at the same time.

When the ignition switch is maintained in an ON state and the dehumidification is continued, Step S107 branches to a NO determination, and the process returns to Step S104. The electronic control unit 10 repeats Step S104 to Step S106 until the ignition switch is switched OFF (i.e., until Step S107 branches to a YES determination). Thereby, the amount of water while the dehumidifier system is driven is stored by the memory for a unit of each measurement time, for example.

When the ignition switch is switched OFF and dehumidification stops, Step S107 branches to a YES determination, and the process proceeds to Step S108. Step S108 is a step which calculates the amount of water condensed by the evaporator. Specifically, a total amount (i.e., an example of a unit: kg) of the condensed water during a time from the switch ON time of the ignition switch to the switch OFF time is calculated as a total ("integration") of the amount of water in each of the unit measurement times. The total amount of condensed water is the amount of dehumidification, and it corresponds to a difference between a physical quantity correlated with the humidity before a start of dehumidification (or humidification) and a physical quantity correlated with the humidity after the turning-off of the dehumidification (or humidification).

Subsequently, Step S109 is performed. Step S109 is a step in which the soak time calculator 13 calculates the soak time (i.e., an example of a unit: h). Specifically, the soak time calculator 13 calculates the soak time by calculating (total amount of condensed water)/(air density)/(air exchange amount). The total amount of the condensed water is a physical quantity calculated in Step S108. The air density is a physical quantity calculated in Step S104. The air exchange amount (i.e., an example of a unit: m³/h) is a volume of air exchanged between the inside and outside of the passenger compartment through a gap or the like per unit time. The air exchange amount is, for example, set in advance as an actual measurement value in the inside air recirculation mode, which is measured in a state in which all the windows and doors of the vehicle are closed. The soak time derived from such calculation depends on the total amount of condensed water (=the amount of dehumidification), i.e., the smaller the amount of dehumidification is, the shorter the soak time becomes.

Subsequently, Step S110 is performed. Step S110 is a step in which the electronic control unit 10 compares the lapse time after the ignition switch is switched OFF with the soak time calculated in Step S109 ("LAPSE TIME FROM IG OFF>SOAK TIME?"). The electronic control unit 10 stands by, i.e., waits, until the lapse time reaches the soak time, by repeating a NO determination in Step S110, which prevents the diagnosis of the outside air humidity sensor 91 during such time. After the lapse time reaches and exceeds the soak time, Step S110 branches to a YES determination.

Subsequently, Step S111 is performed. Step S111 is a step in which the comparator 14 compares, after the lapse of the soak time, the output value of the outside air humidity sensor 91 with the output value of the inside air humidity sensor 92. More specifically, the comparator 14 calculates an absolute value of difference between (i) the relative humidity of the outside air which is output by the outside air humidity sensor 91 and (ii) the relative humidity in the passenger compartment which is output by the inside air humidity sensor 92, and compares such an absolute value with a predetermined threshold. As mentioned above, after the lapse of the soak time from the switching OFF of the ignition switch, the air in the passenger compartment and the air outside of the vehicle equilibrate, thereby the relative humidity of the outside air output by the outside air humidity sensor 91 and the relative humidity of the air in the passenger compartment output by the inside air humidity sensor 92 substantially match. That is, the absolute value of difference between the two relative humidity values is substantially equal to zero at such moment. In other words, when the absolute value of difference of two relative humidity values is detected as greater than a predetermined threshold, it may be determined that the outside air humidity sensor 91 is abnormal.

Step S111 branches to a YES determination, when the absolute value of difference between the output relative humidity values is greater than a threshold. Therefore, when Step S111 is a YES determination, the process proceeds to Step S112, and the possibility of one or more abnormalities is notified to the user. On the other hand, an operation flow is ended when Step S111 is a NO determination.

The above-described contents are about an operation flow of the electronic control unit 10 in the present embodiment.

Next, the effects by adopting the electronic control unit 10 in the present embodiment are described.

The electronic control unit 10 determines the soak time based on the amount of dehumidification by the air-conditioner system 70. That is, the soak time is not a fixed value, i.e., a variable value, which (i.e., the soak time) may be a long time when the amount of dehumidification is large, or may be a short time when the amount of dehumidification is small. In other words, when the humidity difference is large between the air outside the vehicle and the air inside the vehicle, the amount of dehumidification increases, and, in such an environment, the soak time is set as a long time. On the other hand, in an environment where the humidity difference is small, the soak time is set as a short time.

Thus, if the electronic control unit 10 in the present embodiment is adopted, an unnecessarily long soak time will not be fixedly set, i.e., the soak time appropriately set as a proper duration is used and the frequency of diagnoses of the outside air humidity sensor 91 can be increased compared to the conventional method/scheme. Further, the soak time of a fixed duration that may not be useful in an extremely dry or humid environment may now be flexibly changed by the electronic control unit 10 to have an appropriate length according to the environment, thereby improving the accuracy of the failure detection of the outside air humidity sensor 91.

Second Embodiment

In the first embodiment, an example of the soak time variably changed depending on the amount of dehumidification is described. That is, in the first embodiment, the humidity change calculator 12 uses the water content in the passenger compartment as a physical quantity correlated with humidity, and the amount of dehumidification is used as the difference between two physical quantities, before and after dehumidification.

On the other hand, in the present embodiment, the relative humidity detected by the inside air humidity sensor 92 is used for the electronic control unit 10 as a physical quantity correlated with humidity. Although the electronic control unit 10 in the present embodiment has the same configuration as the first embodiment, i.e., has the humidity change calculator 12, it does not have to receive the information on humidity of the air before and after passing the evaporator from the air-conditioner system 70.

Figure 5:
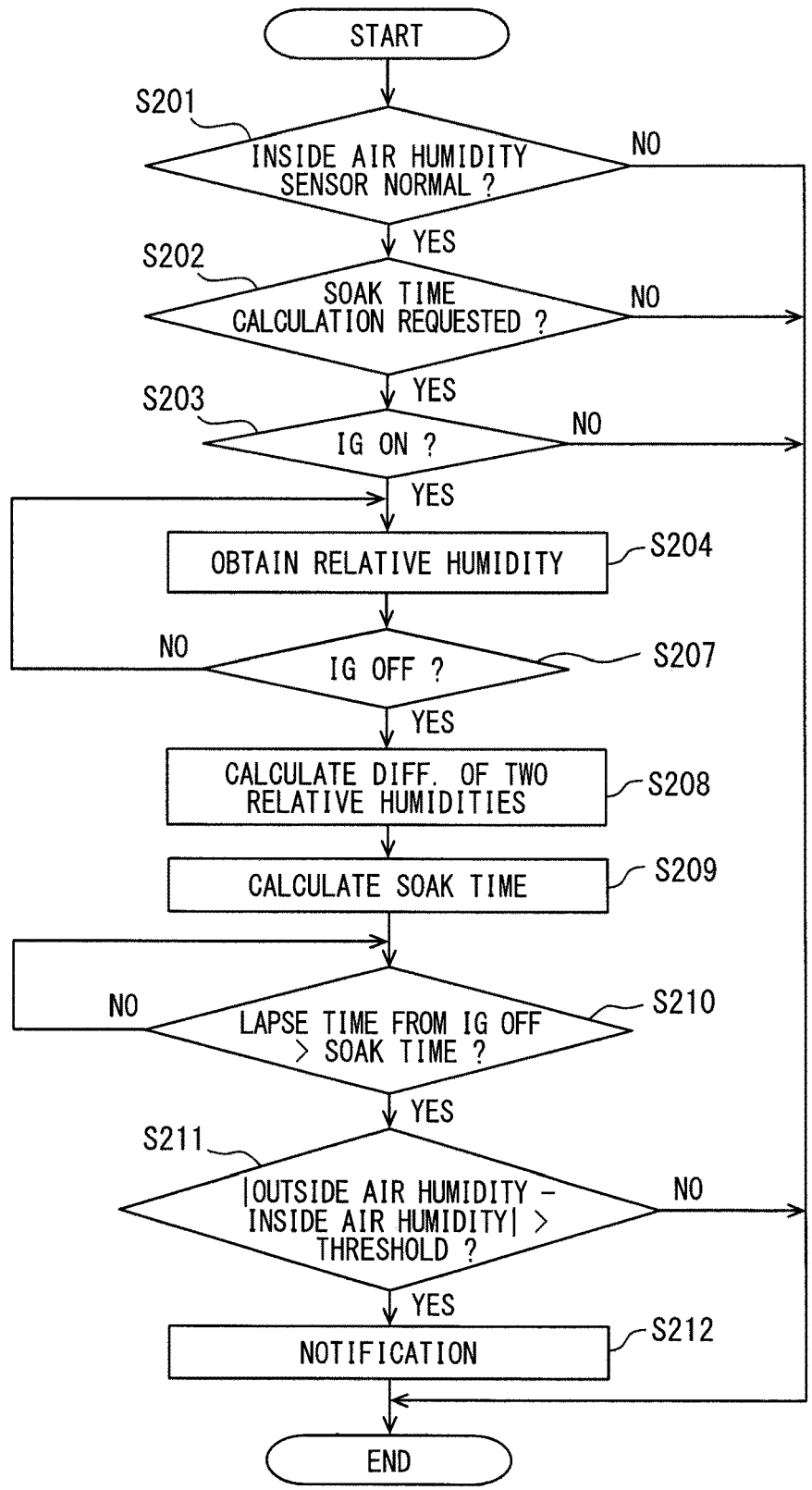
FIG. 5 is a flowchart of an operation of the electronic control unit in a second embodiment of the present disclosure.

With reference to FIG. 5, the operation flow of the electronic control unit 10 is described.

First, Steps S201, S202, and S203 are performed in this written order. Since Steps S201, S202, and S203 are the same as those of Steps S101, S102, and S103 in the first embodiment respectively, the description of those steps is not repeated.

When having a YES determination in Step S203, Step S204 is performed. Step S204 is a step which obtains the relative humidity in the passenger compartment at the time of performing Step S204. The humidity information obtainer 11 which constitutes the electronic control unit 10 obtains the relative humidity in the passenger compartment from the inside air humidity sensor 92. The information on the obtained relative humidity is temporarily stored by the memory, etc.

Subsequently, Step S207 is performed. Step S207 is a step which determines whether the ignition switch is switched OFF, just like Step S107 in the first embodiment. When the ignition switch is not switched OFF, it branches to a NO determination, and the process returns to Step S204. In other words, after switching ON the ignition switch until it is switched OFF, obtaining operation of the relative humidity in Step S204 is repeated with a fixed interval, and the obtained humidity is accumulated in the memory, etc.

When the ignition switch is switched OFF, Step S207 branches to a YES determination, and Step S208 is performed. In Step S208, based on the information on relative humidity that is accumulated in Step S204, the humidity change calculator 12 calculates the difference between the two physical quantities which are respectively correlated with the humidity, i.e., the humidity before starting the dehumidification (or the humidification) and the humidity after turning OFF the dehumidification (or the humidification). More practically, the relative humidity in the passenger compartment immediately after switching ON the ignition switch and the relative humidity in the passenger compartment just before switching OFF the ignition switch are extracted from the information on the relative humidity accumulated in the memory etc., and the difference is calculated. This difference corresponds to the difference between the relative humidity in the passenger compartment and the relative humidity outside the vehicle at time t2 shown in FIG. 3.

Subsequently, Step S209 is performed. Step S209 is a step in which the soak time calculator 13 calculates the soak time. Specifically, the soak time calculator 13 calculates the soak time as a product of three factors, i.e., (the difference of two relative humidities)×(the volume of the passenger compartment)/(the air exchange amount). The difference of the two relative humidities is a physical quantity calculated in Step S208, and has no dimension. The volume of the passenger compartment is uniquely determinable, once the vehicle (model) is determined. The air exchange amount (i.e., an example of a unit: $m^3/h$) is the volume per unit time of the movement/exchange of air through an air gap or like passage which enables air to flow between the inside and the outside of the passenger compartment, i.e., the same as described in the first embodiment. The soak time calculated in this step becomes short (i.e., is shorter) depending on the difference of the relative humidities, i.e., as the difference decreases.

Subsequently, Steps S210, S211, and S212 are performed in this written order. Since Steps S210, S211, and S212 are the same as those of Steps S110, S111, and S112 in the first embodiment respectively, the description of those steps is omitted.

The operation flow of the electronic control unit 10 in the present embodiment appears as the operational flow described above with reference to FIG. 5.

When the electronic control unit 10 described in the present embodiment is adopted, since the soak time is determined according to the humidity change, i.e., the amount of change of the relative humidity by the dehumidification, the soak time becomes long when the amount of dehumidification is large (i.e., increases), and the soak time becomes short when the amount of dehumidification is small. Therefore, just like the first embodiment, without setting the too-long soak time in the first place, the soak time is set to an appropriate length, compared with the conventional art, thereby increasing the frequency of diagnoses of the outside air humidity sensor 91. Further, since the soak time required for the diagnosis can be set appropriately, the failure detection of the outside air humidity sensor 91 is accurately performable.

Third Embodiment

Although, in the first embodiment and the second embodiment, the electronic control unit 10 is described as the one, which performs the diagnosis of the outside air humidity sensor 91 by using the physical quantity difference mainly correlated with the humidity at the time of dehumidification by the air-conditioner system 70, the electronic control unit 10 can also perform the diagnosis of the outside air humidity sensor 91 by performing an intentional humidification with a humidifier.

Specifically, in the engine control system 100 described with reference to FIG. 1 in the first embodiment, the air-conditioner system 70 may be replaced with a humidifier system. The humidifier system includes a humidifier which supplies vapor or mist (e.g., a humidified air) into the passenger compartment. The humidifier may use any publicly-known humidifying method, such as an evaporation method, an ultrasonic method, a steam fan method, and the like, for example.

As an operation flow in the mode which uses the difference of relative humidities for the calculation of the soak time, a flowchart shown in FIG. 5 can be adopted, as is, just like the second embodiment, and diagnosis of the outside air humidity sensor 91 can be performed by such an operation flow. In such case, the relative humidity in the passenger compartment is assumed to be higher than the relative humidity outside the vehicle by a humidifying function during the drive of the humidifier system.

Further, the difference of the vapor contents before and after humidification can also be used for the calculation of the soak time. That is, in other words, the amount of humidification, instead of the amount of dehumidification in the first embodiment, is used for such calculation.

Figure 6:
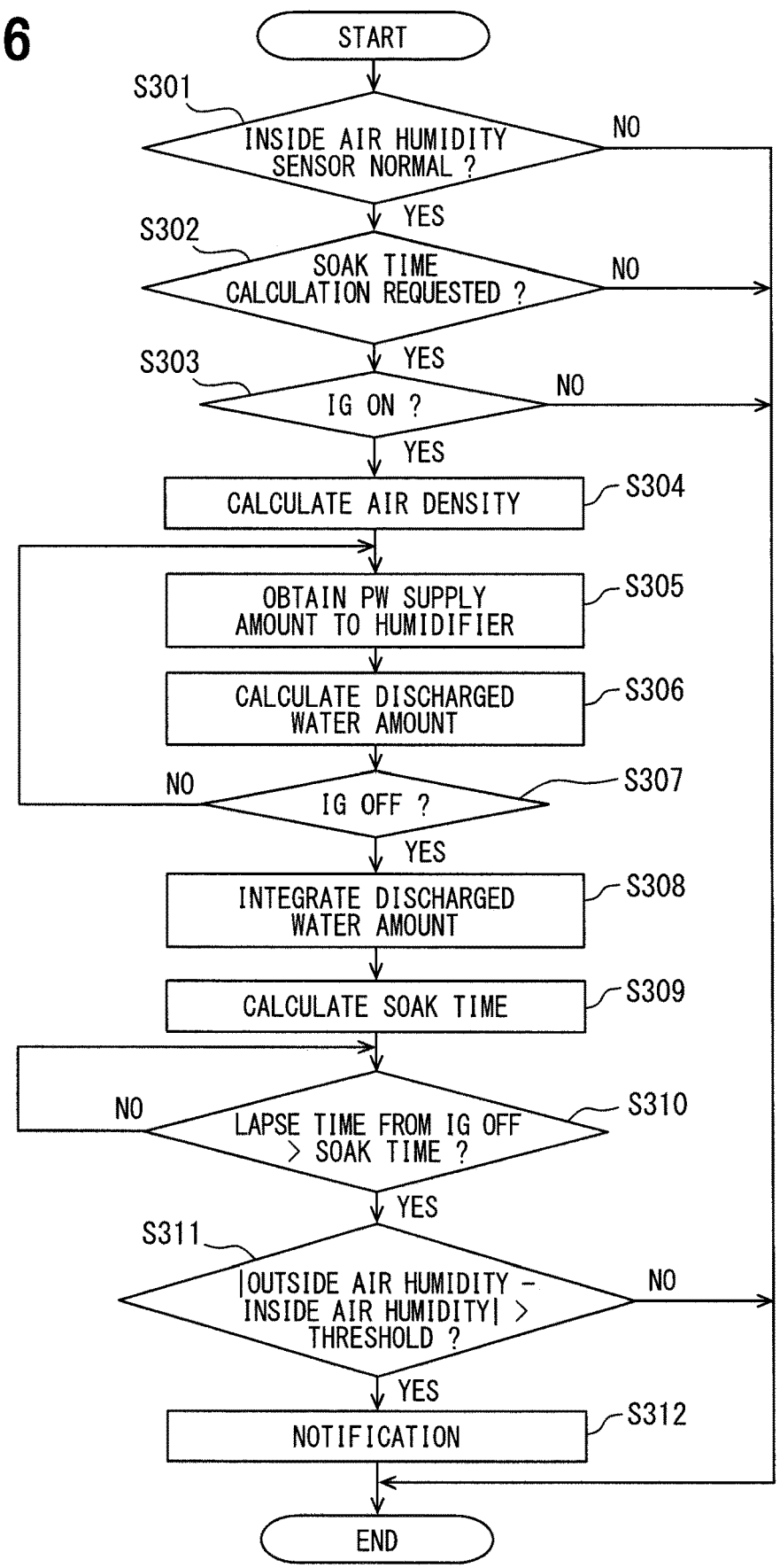
FIG. 6 is a flowchart of an operation of the electronic control unit in a third embodiment of the present disclosure.

The operation flow which performs the diagnosis of the outside air humidity sensor 91 based on the amount of humidification is described with reference to FIG. 6.

First, Steps S301, S302, and S303 are performed in this written order. Since Step S301, S302, and S303 are the same as those of Step S101, S102, and S103 in the first embodiment respectively, the description of those steps is left to the first embodiment. Note that, in the present embodiment, the system started just after the switching ON of the ignition switch is the humidifier system, instead of the air-conditioner system 70, and, in such manner, the humidification by the humidifier is started.

Subsequently, Step S304 is performed. In Step S304, the humidity information obtainer 11 calculates the air density including the vapor in the passenger compartment, based on the relative humidity (i.e., an example of a unit: %) in the passenger compartment obtained by the inside air humidity sensor 92, inside temperature of the passenger compartment (i.e., an example of a unit: ° C.) obtained by the in-vehicle temperature sensor 93, and based on a psychrometric chart, just like Step S104 in the first embodiment.

Subsequently, Step S305 is performed. In Step S305, the humidity change calculator 12 obtains an amount of electric power supplied to the humidifier ("OBTAIN PW SUPPLY AMOUNT TO HUMIDIFIER"). If the humidification method of the humidifier is a method of generating humidified air by using electric power, such as an evaporation method, an ultrasonic method, and a steam fan method, the power consumption for the humidification may be correlated with the amount of humidification. Thus, the humidity change calculator 12 can calculate a corresponding humidification amount (i.e., an example of a unit: kg) by obtaining the amount of electric power supplied to the humidifier.

Subsequently, Step S306 is performed. Step S306 is a step which calculates the amount (i.e., an example of a unit: kg) of water discharged from a humidifier. More specifically, the humidity change calculator 12 calculates the humidification amount per unit time (i.e., an example of a unit: kg/h) based on amount of electric power obtained in Step S305, and then, based on the humidification amount per unit time and the measurement time (i.e., an example of a unit: h) required for performing Step S305-Step S306, the amount of water discharged from the humidifier is calculated. An equation for such calculation may look like (the humidification amount per unit time)×(the measurement time). The measurement time is determined in advance as a predetermined constant value. That is, the humidification amount calculated in Step S306 is an absolute amount of water supplied to and discharged from the humidifier in a fixed measurement time. The calculated water amount is temporarily stored by the memory, etc., for example.

Subsequently, Step S307 is performed. Step S307 is a step which determines whether the ignition switch is switched OFF. When the ignition switch is switched OFF, Step S307 branches to a YES determination, and, when the ignition switch is in a switched ON state, Step S307 branches to a NO determination. In the present embodiment, it is assumed that the humidification system is switched to OFF almost at the same time as the switching OFF of the ignition switch, and thereby humidification stops.

When the ignition switch is maintained in the ON state and the humidification is continued, Step S307 is a NO determination, and the process returns to Step S305. The electronic control unit 10 repeats Step S305 and Step S306 until the ignition switch is switched OFF (i.e., until Step S307 branches to a YES determination). In such manner, the humidification amount during the drive of the humidifier is stored by the memory for every measurement time.

When the ignition switch is switched OFF and humidification stops, Step S307 branches to a YES determination, and the process proceeds to Step S308. Step S308 is a step which calculates the amount of water supplied/discharged from the humidifier. The total amount (i.e., an example of a unit: kg) of humidification during a period between an ignition switch switch-ON time and an ignition switch switch-OFF time is calculated by the humidity change calculator 12, more specifically, by integrating the humidification amount in each of the measurement times stored by the memory. The amount of humidification corresponds to a "difference between (i) a physical quantity correlated with humidity at or before a start of dehumidification or a humidification and (ii) a physical quantity correlated with humidity at or after a switch-off of the dehumidification or the humidification".

Subsequently, Step S309 is performed. Step S309 is a step in which the soak time calculator 13 calculates the soak time (i.e., an example of a unit: h). Specifically, the soak time calculator 13 calculates the soak time by calculating (the humidification amount)/(the air density)/(the air exchange amount). The humidification amount is a physical quantity calculated in Step S308. The air density is a physical quantity calculated in Step S304. The air exchange amount (i.e., an example of a unit: m$^3$/h) is the volume per unit time for the movement and exchange of the air through the air gap or like passage which enables airflow between the inside and the outside of the passenger compartment, i.e., the same thing as described in the first embodiment. The soak time calculated in Step S309 becomes short depending on the humidification amounts, i.e., the smaller the humidification amount is, the shorter the soak time becomes.

Subsequently, Step S310, S311, and S312 are performed in this written order. Since Step S310, S311, and S312 are the same as those of Step S110, S111, and S112 in the first embodiment respectively, the description of those steps is omitted.

The operation flow of the electronic control unit 10 in the present embodiment is the operational flow described above with reference to FIG. 6.

When the electronic control unit 10 described in the present embodiment is adopted, since the soak time is determined according to the humidity change, i.e., the amount of change of the relative humidity by the dehumidification, the soak time becomes long when the amount of dehumidification is large (i.e., increases), and the soak time becomes short when the amount of dehumidification is small. Therefore, just like the first embodiment, without setting the too-long soak time in the first place, the soak time is set to an appropriate length, compared with the conventional art, thereby increasing the frequency of diagnoses of the outside air humidity sensor 91. Further, since the soak time required for the diagnosis can be set appropriately, the failure detection of the outside air humidity sensor 91 is accurately performable.

Fourth Embodiment

For quickly equilibrating the two environments, i.e., the environment of the outside air humidity sensor 91 and the environment of the inside air humidity sensor 92, the vehicle state may be controlled. The operation flow of the electronic control unit 10 described in the second embodiment is used as an example. Note that such control may also be applicable to the operation flow described in the first embodiment or in the third embodiment.

Figure 7:
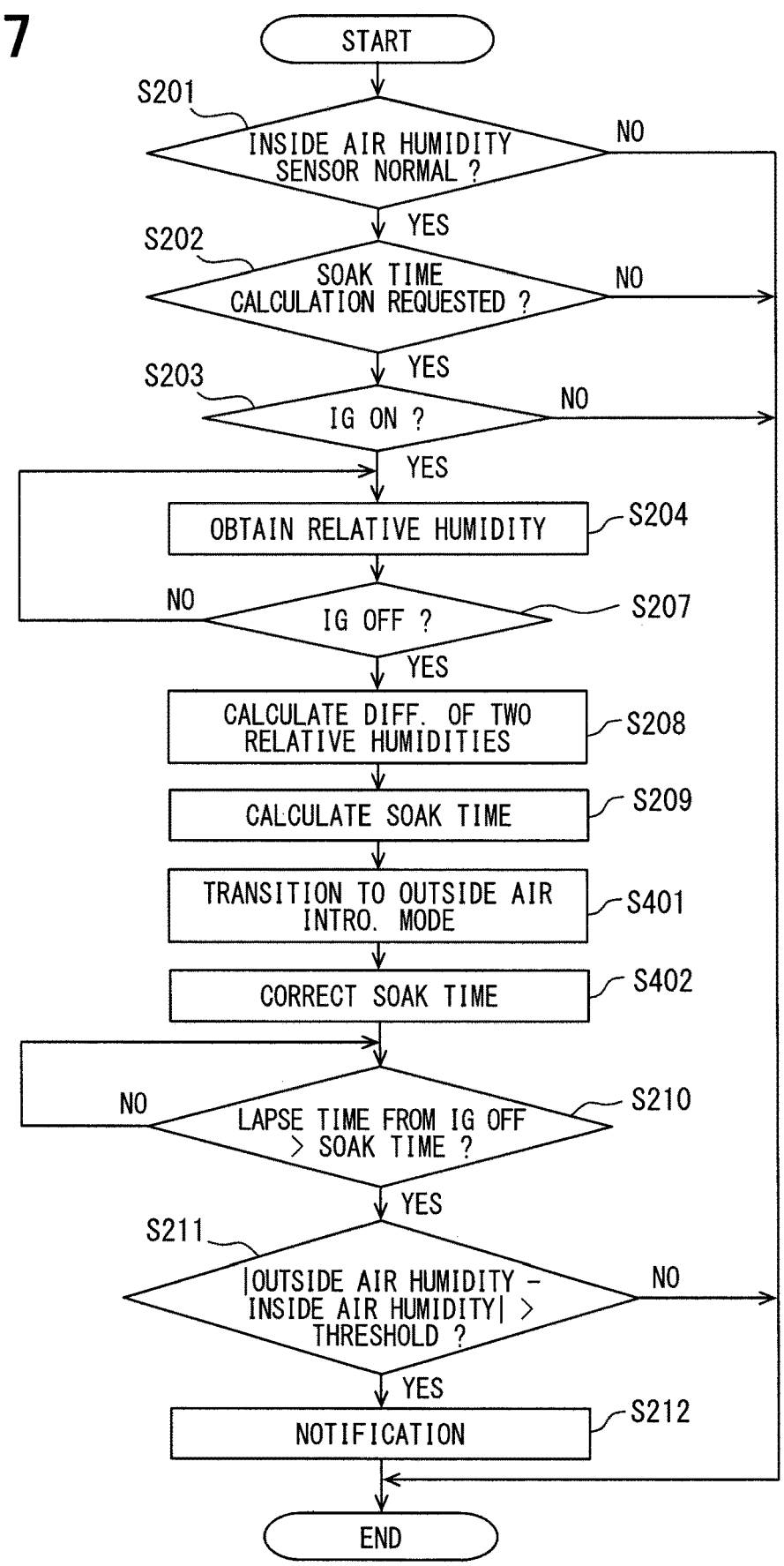
FIG. 7 is a flowchart of an operation of the electronic control unit in a fourth embodiment of the present disclosure.

As shown in FIG. 7, after calculating the soak time in Step S209 and before performing Step S210, Step S401 and Step S402 are inserted. Step S401 is a step in which the electronic control unit 10 instructs the air circulation system 80 to transition the vehicle to the outside air introduction mode. If the vehicle is already in the outside air introduction mode before Step S401, the outside air introduction mode is maintained as it is (i.e., is kept unchanged), and, if the vehicle is in the inside air recirculation mode before Step S401, the inside air recirculation mode is automatically changed to the outside air introduction mode. Compared with the inside air recirculation mode, the air exchange amount between the inside and the outside of the passenger compartment is more easily facilitated in the outside air introduction mode, and the amount of air exchange increases in the outside air introduction mode.

Step S402 is performed after Step S401. Step S402 is a step in which the soak time calculator 13 corrects the soak time calculated in Step S209. In Step S209, although the air exchange amount is used for the calculation of the soak time, this air exchange amount is set as a preset value of the air exchange amount in the inside air recirculation mode, which is an actual measurement value in a state in which all the windows and doors of the vehicle are closed, as mentioned above. On the other hand, the air exchange amount increases in the outside air introduction mode in comparison to the inside air recirculation mode. The soak time calculator 13 corrects the soak time by multiplying the soak time by a ratio of the air exchange amounts, i.e., a ratio derived from a division of the exchanged amount in the inside air recirculation mode by the exchange amount in the outside air introduction mode. The corrected soak time from such calculation is shorter than the value calculated in Step S209.

In Step S210, the electronic control unit 10 performs the diagnosis of the outside air humidity sensor 91 with reference to the corrected soak time.

As mentioned above, after the ignition switch is switched OFF, by transitioning the vehicle state to the outside air introduction mode, the soak time can be shortened further, and the diagnosis opportunity for diagnosing the outside air humidity sensor 91 can be increased.

Other Embodiments

Although various embodiments are described in the above, the present disclosure is not limited to those embodiments, and may be modifiable further to other forms, as long as the gist of the disclosure pertains to the technical scope described in the specification.

For example, as described in each of the above-mentioned embodiments, the start of the dehumidification or the humidification is almost at the same time as the switching ON of the ignition switch and the stop of the dehumidification or the humidification is almost at the same time as the switching OFF of the ignition switch. Further, the trigger of obtaining the inside air humidity information is set to the switch ON time of the ignition switch, and the beginning of the soak time lapse count is set to the switch OFF time of the ignition switch, for example. However, the start time of obtaining the inside air humidity information shown as either Step S103, Step S203, or Step S303 may simply be at any time before the start of the dehumidification or the humidification, i.e., needs not be the switch ON time of the ignition switch. Similarly, the end time for obtaining the inside air humidity information shown as either Step S107, Step S207, or Step S307 may simply be at any time after the end of the dehumidification or the humidification, i.e., needs not be the switch OFF time of the ignition switch. Further, the start of the soak time lapse count may simply be at any time after the end of the dehumidification or the humidification.

Although the present disclosure has been fully described in connection with preferred embodiment thereof with reference to the accompanying drawings, it is to be noted that various changes and modifications become apparent to those skilled in the art, and such changes, modifications, and summarized schemes are to be understood as being within the scope of the present disclosure as defined by appended claims.

What is claimed is:

1. An electronic control unit (ECU) that obtains outside air humidity information from an outside air humidity sensor disposed at a position outside a vehicle compartment of a vehicle and inside air humidity information from an inside air humidity sensor disposed at a position inside the vehicle compartment, the outside air humidity information from the outside air humidity sensor indicative of outside air humidity and the inside air humidity information from the inside air humidity sensor indicative of inside air humidity, the ECU comprising:
    a humidity information obtainer obtaining the inside air humidity information;
    a humidity change calculator calculating the inside air humidity information as a difference between (i) a physical quantity correlated with humidity at or before a start of a dehumidification or a humidification and (ii) a physical quantity correlated with humidity at or after a switch-off of the dehumidification or the humidification;
    a soak time calculator calculating, based on the difference of the physical quantities, a soak time from the switch-off of the dehumidification or the humidification to a sensor-diag startable time at which a diagnosis of the outside air humidity sensor is startable; and
    a comparator comparing the outside air humidity information and the inside air humidity information after a lapse of the soak time from the switch-off of the dehumidification or the humidification, wherein
    the soak time calculator calculates the soak time as a shorter length of time as the difference decreases.

2. The electronic control unit (ECU) of claim 1, wherein the difference is an amount of dehumidification or humidification from the start of the dehumidification or the humidification to the switch-off of the dehumidification or the humidification.

3. The electronic control unit (ECU) of claim 1, wherein the difference is an amount of dehumidification or humidification from a switch-on time of an ignition switch to a switch-off time of the ignition switch.

4. The electronic control unit (ECU) of claim 1, wherein the difference is a humidity difference between humidity at or before the start of the dehumidification or the humidification and humidity at or after the switch-off of the dehumidification or the humidification.

5. The electronic control unit (ECU) of claim 4, wherein the difference is a humidity difference between humidity at an ignition switch switch-on time and humidity at an ignition switch switch-off time.

6. The electronic control unit (ECU) of claim 1, wherein
the vehicle transitions to an outside air introduction mode that introduces outside air into the vehicle compartment after the switch-off of the dehumidification or the humidification, and
the soak time calculator calculates the soak time as a shorter period of time after the switch-off of the dehumidification or the humidification.

7. The electronic control unit (ECU) of claim 1, wherein
the vehicle transitions to an outside air introduction mode that introduces outside air into the vehicle compartment after a switch-off time of an ignition switch, and
the soak time calculator calculates the soak time as a shorter period of time after the switch-off time of the ignition switch.

* * * * *